United States Patent [19]

Chu et al.

[11] Patent Number: 5,605,999

[45] Date of Patent: Feb. 25, 1997

[54] ANAEROBICALLY CURABLE SILICONES

[75] Inventors: Hsien-Kun Chu, Wethersfield; Richard D. Rich, Avon; I. David Crossan, Hebron; Robert P. Cross, Rock Hill, all of Conn.

[73] Assignee: Loctite Corporation, Hartford, Conn.

[21] Appl. No.: 463,173

[22] Filed: Jun. 5, 1995

[51] Int. Cl.$^6$ ................................................ C08G 77/06
[52] U.S. Cl. ............................ 528/24; 528/14; 528/15; 528/19; 526/279
[58] Field of Search .................. 526/279; 528/24, 528/15, 14, 19

[56] References Cited

U.S. PATENT DOCUMENTS

| | | | |
|---|---|---|---|
| 4,035,355 | 7/1977 | Baney et al. | 525/474 |
| 4,158,617 | 6/1979 | Eldred | 204/159.13 |
| 4,245,079 | 1/1981 | Matusumoto et al. | 528/15 |
| 4,503,208 | 3/1985 | Lin et al. | 528/15 |
| 4,528,081 | 7/1985 | Lien et al. | 204/159.13 |
| 4,625,007 | 11/1986 | Ellis et al. | 526/279 |
| 4,699,802 | 10/1987 | Nakos et al. | 427/54.1 |
| 4,701,503 | 10/1987 | Sato | 525/478 |
| 4,742,092 | 5/1988 | Inoue et al. | 522/27 |
| 4,788,240 | 11/1988 | Fujimoto | 524/290 |
| 4,952,711 | 8/1990 | Jacobine et al. | 522/99 |
| 5,079,312 | 1/1992 | Isozaki et al. | 526/279 |
| 5,179,134 | 1/1993 | Chu et al. | 522/37 |
| 5,182,315 | 1/1993 | Chu et al. | 522/37 |
| 5,198,476 | 3/1993 | Kobayashi et al. | 522/31 |
| 5,212,211 | 5/1993 | Welch, II et al. | 522/37 |
| 5,391,593 | 2/1995 | Inoue et al. | 523/176 |

FOREIGN PATENT DOCUMENTS 04268315   2/1991   Japan.

OTHER PUBLICATIONS

Encyclopedia Of Polymer Science And Engineering vol. 11, pp. 1–12, 1988 ed, John Wiley & Sons, NY.

*Primary Examiner*—Melvyn I. Marquis
*Attorney, Agent, or Firm*—Steven J. Hultquist

[57] ABSTRACT

An anaerobically curing composition is comprised of (i) a silicone fluid formed as the reaction product of at least one first silane of formula I:

$$R_n Si(X)_{4-n} \qquad (I),$$

wherein the R groups are the same or different and selected from the group consisting of hydrogen, C1–C12 alkyl, C6–C12 aryl, C7–C18 arylalkyl, C7–C18 alkylaryl, haloalkyl, haloaryl and monovalent ethylenically unsaturated radicals excluding (meth)acryloxy functional groups, X is a hydrolyzable functionality, and n is an integer of from 0 to 3, and at least one second silane of formula II:

$$R^1_m R^2_p Si(X)_{4-(m+p)} \qquad (II),$$

wherein $R^1$ is a (meth)acrylic functional group and $R^2$ can be the same or different and is selected from the group consisting of monovalent ethylenically unsaturated radicals, hydrogen, C1–C12 alkyl, C6–C12 aryl, C7–C18 arylalkyl, and C7–C18 alkylaryl, X is a hydrolyzable functionality, m is an integer from 1 to 3, and m+p is an integer from 1 to 3; (ii) a polymerizable organic (meth)acrylate monomer; and (iii) polymerization initiator.

37 Claims, No Drawings

ANAEROBICALLY CURABLE SILICONES

BACKGROUND OF THE INVENTION

1. Field of the Invention

This invention relates to polyorganosiloxane sealant and adhesive compositions which cure in the absence of oxygen. More specifically, the invention relates to polyorganosiloxane sealants which cure in the absence of oxygen and which have improved fixation and curing times, strength and thermal stability.

2. Description of Related Art

Anaerobically curing sealant compositions have been known for a long time. These compositions were however, limited to those based on polyalkylene ether polymerizable monomers and organic (meth)acrylate polymerizable monomers. Such compositions typically show poor thermal stability properties.

Because of their excellent thermal stability, silicones (polyorganosiloxanes) have been used for many sealant, adhesive and coating applications. However, because of large amounts of dissolved oxygen and high permeability to oxygen it was generally believed that silicones would not be anaerobically curable. U.S. Pat. No. 4,035,355 to Baney et al. teaches anaerobically curing sealant compositions of acrylate-containing polyorganosiloxanes and a hydroperoxy polymerization initiator. The Baney compositions are however, disadvantageous due to their relatively long cure time of approximately 24 hours.

U.S. Pat. No. 5,391,593 to Inoue et al. is directed to a silicone rubber sealant composition comprising an organopolysiloxane, an organic peroxide and carbon black which is said to cure under anaerobic conditions into silicone rubber having improved physical properties. These silicones do not however, fully cure until about 2 to 3 days after removal of oxygen. Japanese Kokai JP 04268315 to Toshiba Silicone Co, Ltd. is directed to an anaerobically and ultraviolet curable polyorganosiloxane composition for adhesive purposes that is reported as having good heat resistance. This composition is said to show adhesion after 2 hours.

Thus it would be a significant advance in the art to provide an anaerobically curing silicone composition that cures in a short period of time without sacrificing heat stability and strength properties of the cured resin.

SUMMARY OF THE INVENTION

The present invention is directed to anaerobically curable silicone compositions having high heat stability strength and a relatively short fixation and cure time and a method for producing same. The compositions comprise (i) a silicone fluid formed as the reaction product of at least one first silane of formula I:

$$R_nSi(X)_{4-n} \qquad (I),$$

wherein the R groups are the same or different and selected from the group consisting of hydrogen, C1–C12 alkyl, C6–C12 aryl, C7–C18 arylalkyl, C7–C18 alkylaryl, haloalkyl, haloaryl, and monovalent ethylenically unsaturated radicals excluding (meth)acryloxy functional groups, X is a hydrolyzable functionality, and n is an integer of from 0 to 3, and at least one second silane of formula II:

$$R^1{}_mR^2{}_pSi(X)_{4-(m+p)} \qquad (II),$$

wherein $R^1$ is a (meth)acrylic functional group and $R^2$ can be the same or different and is selected from the group consisting of monovalent ethylenically unsaturated radicals, hydrogen, $C_1$–$C_{12}$ alkyl, C6–C12 aryl, C7–C18 arylalkyl, and C7–C18 alkylaryl, X is a hydrolyzable functionality, m is an integer from 1 to 3, and m+p is an integer from 1 to 3; (ii) a polymerizable organic (meth)acrylate monomer; and (iii) polymerization initiator.

Thus, the present silicone compositions comprise, in addition to (meth)acryloxy functionalized silicones, organic acrylates. The compositions when formulated with polymerization initiator cure anaerobically. The compositions of the present invention are shown to have fixture time on pin and collar or nut and bolts comparable to that of polymerizable organic acrylate monomers and much faster than silicone only compositions. Approximately 15 minutes is needed to fix pin and collar or nut and bolt assemblies with the present invention, whereas a minimum of 1–2 hours is generally needed to fix known silicone only compositions. The present invention compositions were surprisingly found to have higher strength than the organic monomer compositions or silicone formulations alone. Additionally, the present compositions retain some adhesive strength even after heat aged at 250° C. for 1 week. Polymerizable organic (meth)acrylate monomer compositions would completely fail under comparable conditions.

For the purposes of this invention the term (meth)acrylate or (meth)acrylic is a general expression to be taken as including methacryloxy or acryloxy radicals of the formula $$\begin{array}{c} \text{O} \\ \| \\ \text{CH}_2{=}\text{CCO} \\ | \\ \text{R} \end{array}$$

where R is H or CH3.

DETAILED DESCRIPTION OF THE INVENTION AND PREFERRED EMBODIMENTS THEREOF

In a first embodiment, the present invention is directed to an anaerobically curing composition comprising:

(i) a silicone fluid formed as the reaction product of at least one first silane of formula I:

$$R_nSi(X)_{4-n} \qquad (I),$$

wherein the R groups are the same or different and selected from the group consisting of hydrogen, C1–C12 alkyl, C6–C12 aryl, C7–C18 arylalkyl, C7–C18 alkylaryl, haloalkyl, haloaryl, and monovalent ethylenically unsaturated radicals excluding (meth)acryloxy functional groups, X is a hydrolyzable functionality, and n is an integer of from 0 to 3, and at least one second silane of formula II:

$$R^1{}_mR^2{}_pSi(X)_{4-(m+p)} \qquad (II),$$

wherein $R^1$ is a (meth)acrylic functional group and $R^2$ can be the same or different and is selected from the group consisting of monovalent ethylenically unsaturated radicals, hydrogen, C1–C12 alkyl, C6–C12 aryl, C7–C~arylalkyl, and C7–C~alkylaryl, X is a hydrolyzable functionality, m is an integer from 1 to 3, and m+p is an integer from 1 to 3;

(ii) a polymerizable organic (meth)acrylate monomer; and
(iii) polymerization initiator.

The silicone fluid is from about 40 weight % to about 95 weight % of the composition, preferably from about 50 weight % to about 90 weight % of the composition, and most preferably from about 60 weight % to about 85 weight % of the composition.

In the reaction forming the silicone fluid according to the present composition said at least one second silane is from about 1 to about 99 mole %, preferably from about 10 to about 70 mole %, and most preferably from about 20 to about 50 mole % of the total of said at least one first and said at least one second silane. It therefore follows that said at least one first silane is from about 99 to about 1 mole %, preferably from about 90 to about 30 mole % and most preferably from about 80 to about 50 mole % of the total of said at least one first and said at least one second silanes.

In the composition according to the present innovation, the hydrolyzable functionality in either or both the first silane or the second silane may be any functionality which when attached to a silicon atom via a Si—O, Si-halo, Si—N or Si—S bond is readily hydrolyzable in the presence of water. Examples of such functionalities include, but are not limited to halogen, (meth)acryloxy, alkoxy, aryloxy, isocyanato, amino, acetoxy, oximinoxy, aminoxy, amidato, and alkenyloxy.

In compositions of the present invention, R may preferably be selected from the group consisting of C1–C alkyl and C6–C aryl. In such instances when R is C1–C alkyl or C6–C aryl, examples of typical first silanes that may be used in preferred embodiments of the present invention include, but are not limited to, dimethylchlorosilane, phenyltrichlorosilane, tetrchlorosilane, trimethylchlorosilane, trimethylmethoxysilane, dimethyldimethoxysilane and phenyltrimethoxysilane, and tetraethoxysilane.

Polymerizable organic (meth)acrylate monomers suitable for use in the present invention include all such monomers known in the art. Examples of such monomers include, but are not limited to, hydroxyethyl methacrylate, polyethyleneglycol dimethacrylate, isobornyl acrylate, trimethylolpropane ethoxy triacrylate, triethyleneglycol dimethacrylate, ethyleneglycol dimethacrylate, tetraethyleneglycol dimethacrylate, polyethyleneglycol diacrylate, 1,3-butyleneglycol dimethacrylate, trimethylol propane trimethacrylate, neopentylglycol dimethacrylate, ethoxylated bisphenol A dimethacrylate, propoxylated bisphenol C dimethacrylate, bisphenol A bis(2-hydroxypropyl)dimethacrylate, cyclcohexyl methacrylate, 2-ethylhexyl methacrylate, hydroxyethyl methacrylate, isooctyl acrylate and n-butyl acrylate. Polyethyleneglycol dimethacrylate, 2-hydroxyethyl methacrylate, and dihydrocyclopentadienyloxyethyl methacrylate are preferred.

The polymerizable organic (meth)acrylate is present in an amount that is from about 1 weight % to about 60 weight %, preferably from about 5 weight % to about 50 weight %, and most preferably from about 10 weight % to about 40 weight %, based on the total composition.

In preferred embodiments of the present composition the (meth)acrylic functional group of said at least one second silane is selected from the group consisting of (meth)acryloxyalkyl, (meth)acryloxyalkenyl, (meth)acryloxyaryl. Preferably, the methacrylic functional group is (meth)acryloxypropyl.

In the present composition, when R2 is selected from the group consisting of C1–C alkyl, C6–C aryl, alkenyl, (meth)acryloxy, and vinyl, said at least one second silane is selected from the group consisting of (meth)acryloxypropyl trimethoxysilane, (meth)acryloxypropyl trichlorosilane, (meth)acryloxypropyl dimethylchloro silane, (meth)acryloxymethyl dichlorosilane and (meth)acryloxymethyldimethyl acryloxysilane.

The at least one second silane component can be obtained commercially or prepared by any method known in the art to prepare methacrylate functional silanes. Examples of such methods can be found in U.S. Pat. Nos. 2,793,223; 2,898,361; 2,922,806; 2,922,807; 4,348,454, 4,665,147; 5,179,134; 5,182,315; and 5,212,211, the disclosures of which are all hereby incorporated herein by reference in their entirety.

The compositions described hereinabove are given anaerobic characteristics by incorporating therein an appropriate polymerization initiator system. The initiator must be capable of inducing polymerization of the composition in the substantial absence of oxygen, and yet not induce polymerization as long as oxygen is present. Although all art known initiator systems capable of inducing polymerization in the substantial absence of oxygen are suitable for use in the present invention, since the compositions used in this invention may be cured through free radical mechanism, a typical initiator system for use in the present invention is a redox polymerization initiator. Such an initiator system is comprised of an ingredient or combination of ingredients which produce an oxidation reduction reaction, resulting in the production of free radicals. The most common initiator systems of this type are those involving peroxy materials which under the appropriate conditions decompose to form peroxy free radicals.

A class of peroxy initiators, which has been found readily adaptable to the anaerobic concept and particularly suitable to the present invention is the hydroperoxy initiators. Of these, organic hydroperoxides are preferred. Particularly preferred organic hydroperoxides include, p-menthane hydroperoxide, diisopropyl benzene hydroperoxide, pinene hydroperoxide, methyl ethyl ketone hydroperoxide, t-butyl-2-hydroxyethyl peroxide, t-butyl peroxymaleic acid, cumene hydroperoxide and tertiary-butyl hydroperoxide. Additionally, inorganic peroxides and compositions such as peroxy esters as for example t-butyl perbenzoate, benzophone peroxyesters and fluorenone peroxyesters, peroxy carbonates and halogen containing compounds having electronic structures which facilitate free radical formation, esters which decompose to form free radicals are also useful. Thus, as used herein, the term "peroxy" is intended to mean peroxides, hydroperoxides and peresters which are suitable for preparing anaerobically curing system.

The polymerization initiators should be used in the compositions of the present invention in merely the amount needed to cure the composition after the composition has been excluded from oxygen. Polymerization initiator may be used in amount which are from about 0.01 weight % to about 10 weight % based on the total composition.

The compositions of this invention may also comprise stabilizers and accelerators such as primary accelerators and secondary accelerators. Examples of accelerators useful in the present invention, include, but are not limited to, diethyl p-toluidine, saccharin, and acetyl phenyl hydrazine. The purpose of these is to stabilize the composition during storage and provide controllable curing rates when oxygen is excluded from the compositions.

The present compositions optionally comprise fillers, pigments, and additives. Such optional components may include all which are common to the organosilicon art as long as they do not adversely effect the anaerobic curing properties of the compositions.

The present compositions may be prepared by mixing under ambient conditions and in the absence of active metals, the appropriate amount of at least one first silane according to formula I:

$$R_nSi(X)_{4-n} \quad (I),$$

wherein the R groups are the same or different and selected from the group consisting of hydrogen, C1–C alkyl, C6–C aryl, C7–C–arylalkyl, C7–C–alkylaryl, haloalkyl, haloaryl and monovalent ethylenically unsaturated radicals excluding (meth)acryloxy functional groups, X is a hydrolyzable functionality, and n is an integer of from 0 to 3; at least one second silane of formula II:

$$R^1_mR^2_pSi(X)_{4-(m+p)} \quad (II),$$

wherein $R^1$ is a (meth)acrylic functional group and $R^2$ can be the same or different and is selected from the group consisting of monovalent ethylenically unsaturated radicals, hydrogen, C1–C alkyl, C6–C aryl, C7–C–arylalkyl, and C7–C–alkylaryl, X is a hydrolyzable functionality, m is an integer from 1 to 3, and m+p is an integer from 1 to 3; a polymerizable organic (meth)acrylate monomer; polymerization initiator and any other appropriate components, using any of the techniques which are common to the polymer art, such as blending and stirring.

By the term ambient conditions it is meant that oxygen is not excluded from the composition and the temperature of the composition is approximately equal to room temperature. By the term active metal it is meant those metals that are known to catalyze the anaerobic curing process in the presence of an appropriate anaerobic curing initiator, as for example a hydroperoxy initiator. Examples of active metals, include but are not limited to iron, steel, nickel, copper, bronze, brass, commercial aluminum, cobalt, manganese and beryllium. The compositions of the present invention can be prepared and used immediately, if desired or the composition can be prepared and stored for long periods of time prior to their intended use. It is only necessary to maintain contact between said compositions and oxygen in the well known manner and to avoid presence of even small amounts of active metals to prevent the storable compositions from curing.

When the compositions of this invention are brought into contact with an activating surface such as an active metal surface, and oxygen is not allowed to contact the composition such as when the compositions are applied to threads of a steel bolt and/or nut and the nut is threaded onto the bolt, a relatively rapid curing reaction takes place whereupon the composition is polymerized to an insoluble solid. The compositions of this invention can also be cured by heating in the presence or absence of air.

The compositions of this invention cure to solid materials which are insoluble in common organic solvents and are characterized by improved thermal stability and decreased fixation time relative to anaerobically curing compositions that are based on only polymerizable organic monomers and those based on known anaerobically curing silicone compositions. Simple thermogravimetric analysis and a nitrogen atmosphere can be used to evaluate the thermal stability of the composition. The temperature at which rapid weight loss begins is noted and is designated the upper limit temperature for the compositions. The upper limit temperature is an indication of the lowest temperature at which the composition will have no useful life because of thermal degradation of the composition.

The efficacy of the compositions of this invention as anaerobically curing sealant compositions is determined by the prevailing torque test. In this test several drops of the composition to be tested are placed on the threads of a metal bolt and/or nut, the nut is threaded on to the bolt and the resulting assembly of nut, bolt and composition is kept at room temperature for a period of time while the composition between the bolt and nut cures. At the end of a specified length of time the torque required to produce relative motion between the nut and bolt of an assembly is noted at 90°, 180°, 270°, and 360° of rotation. The prevailing torque for the assembly is the average of the four torques measurements so taken.

The compositions of this invention are useful in a method for sealing the small volumes between two or more surfaces, at least one surface of which is an activating surface such as an active metal such as the volume between the two mating portions of surfaces brought into close proximity. Examples of an activating surface include the surface of an inactive material such as glass, cadmium, titanium and zinc, or the surface of an inhibiting surface such as certain anodized surfaces, oxide finishes and chromate finishes having deposited thereon an active metal or any of the activating priming compositions that are well known in the anaerobic sealing art. Examples of two mating surfaces brought into close proximity in addition to the aforementioned nut and bolt assembly, include a concentric arrangement of parts such as a cylinder placed in a tube having an inside diameter slightly larger than the diameter of the cylinder or a parallel arrangement of parts such as one flat surface pressed onto another flat surface. Other examples will be readily apparent to one skilled in the art.

The composition can be positioned onto and in contact with the surfaces by any suitable means such as spreading or dipping and the surfaces then brought into close proximity. Any solvent which may be present should be allowed to evaporate before the surfaces are brought into close proximity. Alternately, when the composition shows sufficient fluidity, the surfaces can be brought into close proximity and the composition subsequently positioned, e.g., by capillary action, into the small volume between and in contact with the surface. The composition, however, positioned and enclosed by the surface, being effectively excluded from oxygen, cures to an insoluble solid and adheres to said surface thereby providing an assembly with two or more surfaces held in a fixed relative configuration.

In another embodiment the invention is directed to a method of producing an anaerobically curing composition. The method comprises allowing at least one first silane of formula I:

$$R_nSi(X)_{4-n}, \quad (I)$$

wherein the R groups are the same or different and selected from the group consisting of hydrogen, C1–C alkyl, C6–C aryl, C7–C–arylalkyl, C7–C–alkylaryl and monovalent ethylenically unsaturated radicals excluding (meth)acryloxy functional groups, X is a hydrolyzable functionality, and n is an integer of from 0 to 3 to react with at least one second silane of formula II:

$$R^1_nR^2_mSi(X)_{4-(m+n)} \quad (II),$$

wherein $R^1$ is a (meth)acryloxy functional group and $R^2$ is selected from the group consisting of monovalent ethylenically unsaturated radicals, hydrogen, C1–C alkyl, C6–C aryl, C7–C–arylalkyl, and C7–C–alkylaryl, X is a hydrolyzable functionality, m is an integer from 1 to 3, and m+p is an integer from 1 to 3 to produce a silicone fluid in the presence an effective amount of water to hydrolyze hydrolyzable groups on the first and second silanes. At ambient temperature, in the presence of oxygen, polymerizable (meth)acrylate monomer and a polymerization initiator are added to the silicone fluid thereby producing the anaerobically curable composition.

The following examples which illustrate this invention should not be construed as limiting the invention which is properly delineated by the appended claims.

EXAMPLES

Example 1

In a 1 liter 3 necked round bottom flask equipped with a mechanical stirrer, thermometer and addition funnel was charged with 49.9 g trimethylmethoxysilane, 52.8 g dimethyldimethoxysilane, 106.9 g phenyltrimethoxysilane and 133.9 g methacryloxypropyl trimethoxysilane. A 2% aqueous HCl solution (67.1 g) then was slowly added to the mixture over a half hour period with vigorous stirring. The mixture was heated to 70° C. with nitrogen sparge to remove methanol. The mixture was further heated to 90° C. for 10 minutes after methanol removal. The mixture was then cooled and diluted with approximately 300 ml toluene. The toluene solution was separated and washed repeatedly with water and aqueous sodium bicarbonate solution. Toluene was then removed under reduced pressure to yield a liquid resin with a viscosity of 23,000 cps.

TABLE I

| COMPONENT | % WEIGHT |
| --- | --- |
| Polyethyleneglycol Dimethacrylate MW = 400 | 94% |
| Cumene Hydroperoxide | 3% |
| diethyl p-toluidine | 1% |
| Saccharin | 2% |

Ninety-six parts of this resin was mixed with 1 part of saccharin, 2 parts of cumene hydroperoxide, 1 part of diethyl p-toluidine and 100 parts of the composition set forth in Table I above. Several drops of this mixture then were applied to ⅜ inch nut and bolt assemblies. The mixture cured anaerobically at ambient temperature as well as at 250° F. The prevailing torque for the assemblies were measured 24 hours after application. The results are compared with results obtained using the composition X in Table I and are shown below:

| 50-50 Resin & Composition X | Composition X Only |
| --- | --- |
| Prevailing Torque 200 inch-lbs. 24 hr. room temperature | 250 inch-lbs. |
| Prevailing Torque 180 inch-lbs. 24 hr-250° F. (hot break) | 260 inch-lbs. |

Example 2

Resin from Example 1 was further formulated in the following manner: 50 parts of the resin was mixed with 1 part of saccharin, 1 part of diethyl p-toluidine and 2 parts of cumene hydroperoxide. The formulated resin (i) was further mixed with 2-hydroxyethyl methacrylate (HEMA) in various ratios. Steel pin and collar assemblies were used to test the efficacy of the anaerobic formulations. Several drops of the anaerobic formulations were dropped onto the cylindrical surface of a 2 inch steel pin with ½ inch diameter. A ⁷⁄₁₆ inch thick steel collar having an inside diameter slightly larger than the pin was placed over the cylinder. Both mating surfaces of the cylinder and collar were wetted by the anaerobic formulation by gently rotating and sliding the pin and collar. After wetting, the assembly was allowed to cure at ambient conditions as well as at 250° F. for 48 hours. The shear stresses needed to break the pin and collar assemblies are then determined. The fixture times for the assemblies are also determined. Fixture time in this example is defined as the time needed to fix the pin and collar assembly so that when placed vertically on a horizontal plane, enough cure would have taken place to prevent the collar from slipping down the pin due to gravity. The results are shown in Table II below (N/cm²=Newton/square centimeter):

TABLE II

| Sample | Fixture Time, hr. | Curing Conditions | Shear Stress (N/cm$^2$) |
| --- | --- | --- | --- |
| Silicone Formulation (i) | 1–2 | ambient - 48 hours | 222 |
| Composition X | 0.25 | ambient - 48 hours | 120 |
| Silicone (I): HEMA = 1:1 | 0.25 | ambient - 48 hours | 312 |
| Silicone (I): HEMA = 2:1 | 0.25 | ambient - 48 hours | 191 |
| Composition X | 0.25 | 250° F. - 48 hours | 158 |
| Silicone (I): HEMA = 2:1 | 0.25 | 250° F. - 48 hours | 272 |

Example 3

In a 1 liter 3 necked round bottom flask equipped with a mechanical stirrer, thermometer and an addition funnel was charged with 42.4 g dimethyldimethoxysilane, 57.5 g phenyltrimethoxysilane, and 114.1 g methacryloxypropyl trimethoxysilane. With rapid stirring, 57.3 g of a 2% aqueous HCl solution was slowly added to the mixture in a one hour period. The mixture was then heated to 75° C. for one hour with removal of methanol. The mixture was further heated to 90° C. for approximately 10 minutes. The mixture was then allowed to cool to room temperature. The material was washed with aqueous sodium bicarbonate. The mixture was then diluted with approximately 300 ml of toluene. The toluene solution was then washed repeatedly with water and dried. Toluene was then removed under reduced pressure to yield a clear liquid with a viscosity of 420 cps.

The resin thus prepared was formulated with 1% saccharin, 1% diethyl p-toluidine and 2% cumene hydroperoxide. A separate 2-hydroxyethyl methacrylate formulation was also prepared by mixing 2-hydroxyethyl methacrylate with same levels of saccharin, diethyl p-toluidine and cumene hydroperoxide. The silicone resin and 2-hydroxyethyl methacrylate formulation was then mixed in various ratios. The fixture time was determined using ⅜ inch nut and bolt assemblies. The time required for the formulation to cure anaerobically to such an extent that the ⅜ inch nut and bolt assembly can not be twisted off using hands is determined. The efficacy of the formulations were tested on the steel pin and collar assemblies as described in Example 2. Heat aging tests for the assemblies were performed 72 hours after ambient cure. Shear stress (N/cm$^2$) needed to break the assemblies are recorded. The results are shown in Table III below:

TABLE III

| | Fixture Time (hr) | 25° C. - 1 week | 150° C. - 1 week | 250° C. - 1 week |
|---|---|---|---|---|
| Composition X | 0.25 | | | 0 |
| 2-HEMA only (no silicone) | 0.25 | 263 | 356 | 0 |
| HEMA:Silicone = 1:1 | 0.25–0.5 | 207 | 319 | 2.3 |
| HEMA:Silicone = 1:2 | 0.25–0.5 | 183 | 239 | 5.4 |
| HEMA:Silicone = 1:4 | 0.25–0.5 | 114 | 150 | 7.3 |
| Silicone only | >2.0 | 103 | 137 | 7.4 |

Example 4

In a two liter 3 necked round bottom flask equipped with a mechanical stirrer, thermometer and an addition funnel was charged with 466 g of toluene, 152.2 g of trimethylchlorosilane, 237.6 g of phenyltrimethoxysilane, and 347.2 g of methacryloxypropyl trimethoxysilane. With rapid stirring, 404 g of water was slowly added to the solution. An exothermic reaction ensued so that the temperature of the mixture rose to 60° C. After the addition of water, the mixture was further heated to 90° C. for 4 hours. When the mixture was still warm (50° C.), washing with aqueous sodium bicarbonate solution began. The mixture was repeatedly washed with aqueous sodium bicarbonate solution until neutral. The mixture was then further washed with water. Phase inversion was observed during washing. The mixture was further diluted with 1 liter of hexane and dried over magnesium sulfate overnight. The mixed solvent was then evaporated under reduced pressure. The viscosity of the resin was found to be 2660 cps.

Ninety-six parts of the resin thus prepared was mixed with 1 part of saccharin, 1 part of diethyl p-toluidine and 2 parts of cumene hydroperoxide. Separately, 96 parts of a polyethyleneglycol dimethacrylate (PEGMA) (approximate molecular weight=370) was also formulated with 1 part of saccharin, 1 part of diethyl p-toluidine and 2 parts of cumene hydroperoxide. The silicone formulation and the polyethyleneglycol dimethacrylate formulation were then mixed in various ratios. The efficacy of various formulations were determined using steel pin and collar assemblies (shear stress, kg/cm$^2$) and the fixture time of various formulations were determined using ⅜ inch nut and bolt assemblies. The results are shown in Table IV below:

TABLE IV

| | Fixture Time (hr.) | 25° C. 1 week | 150° C. 1 week | 175° C. 1 week | 200° C. 1 week | 225° C. 1 week |
|---|---|---|---|---|---|---|
| 100% PEGMA | <0.25 | 87 | 120 | 40 | 13 | 11 |
| PEGMA:Silicone = 1:1 | <0.25 | 155 | 98 | 64 | 10 | 2 |
| PEGMA:Silicone = 1:2 | <0.25 | 130 | 130 | 104 | 13 | 3 |
| 100% Silicone | 2–3 | 108 | 107 | 112 | 96 | 57 |

Example 5

In a similar fashion to Example 4, phenyl trimethoxysilane (257.8 g) and acryloxymethyldimethyl acryloxysilane (187.3 g) were co-hydrolyzed using 67.1 g of 2% aqueous HCl solution to yield a liquid with a viscosity of 4,200 cps. Thirty grams of this resin was further formulated with 3.0 g of a hydrophobic fumed silica (HDK-2000), 2.75 g m-phenylene dimaleimide, 5.50 g dihydrocyclopentadienyloxyethyl methacrylate, 0.18 g saccharin, 0.18 g diethyl p-toluidine and 0.36 g cumene hydroperoxide. The formulated resin has a viscosity of 9,000 cps. The formulation was applied to ⅜" nut and bolt assemblies. The fixture time was found to be 15 minutes. The assemblies were further heat aged. The break and prevailing torques (inch-lb) are determined and shown below:

| Room Temperature Cure: | 230/240 |
|---|---|
| 225° C. - 24 hours | 150/250 |
| 225° C. - 48 hours | 125/280 |

Example 6

(A) Formulation A was made in the following manner.

A solution containing trimethylchlorosilane 0.35 moles, methacryloxypropyltrimethoxysilane 0.40 moles, phenyltrimethoxysilane 0.05 moles and tetraethoxysilane 0.20 moles in approximately 70 grams of xylene were mixed and stirred in a 500 ml 3-neck round bottom flask equipped with a mechanical stirrer, reflux condenser and an addition funnel. Approximately 25–30 grams of water was then slowly added to the solution over a 15 minute period. The addition of water caused a light exotherm. The mixture was further stirred for 4 hours. The mixture was allowed to phase separate and the aqueous layer discarded. The organic layer was vacuum stripped at 70° C. to remove the xylene solvent.

(B) Formulation B was made in the following manner.

A solution containing trimethylchlorosilane 0.35 moles, methacryloxypropyltrimethoxysilane 0.38 moles and phenyltrimethoxysilane 0.27 moles in approximately 70 grams of xylene were mixed and stirred in a 500 ml 3-neck round bottom flask equipped with a mechanical stirrer, reflux condenser and an addition funnel. Approximately 25–30 grams of water was then slowly added to the solution over a 15 minute period. The addition of water caused a light exotherm. The mixture was further stirred for 4 hours. The mixture was allowed to phase separate and the aqueous layer discarded. The organic layer was vacuum stripped at 70° C. to remove the xylene solvent.

(C) Formulation C was made in the following manner.

A solution containing trimethylchlorosilane 0.30 moles, methacryloxypropyltrimethoxysilane 0.30 moles, phenyltrimethoxysilane 0.10 moles and tetraethoxysilane 0.30 moles in approximately 70 grams of xylene were mixed and stirred in a 500 ml 3-neck round bottom flask equipped with a mechanical stirrer, reflux condenser and an addition funnel. Approximately 25–30 grams of water was then slowly added to the solution over a 15 minute period. The addition of water caused a light exotherm. The mixture was further stirred for 4 hours. The mixture was allowed to phase separate and the aqueous layer discarded. The organic layer was vacuum stripped at 70° C. to remove the xylene solvent.

(D) Formulation D was made in the following manner.

A solution containing trimethylchlorosilane 0.35 moles, methacryloxypropyltrimethoxysilane 0.20 moles, phenyltrimethoxysilane 0.25 moles and tetraethoxysilane 0.20 moles in approximately 70 grams of xylene were mixed and stirred in a 500 ml 3-neck round bottom flask equipped with a mechanical stirrer, reflux condenser and an addition funnel. Approximately 25–30 grams of water was then slowly added to the solution over a 15 minute period. The addition of water caused a light exotherm. The mixture was further stirred for 4 hours. The mixture was allowed to phase separate and the aqueous layer discarded. The organic layer was vacuum stripped at 70° C. to remove the xylene solvent.

(E) Formulation E was made in the following manner.

A solution containing trimethylchlorosilane 0.30 moles, methacryloxypropyltrimethoxysilane 0.40 moles, phenyltrimethoxysilane 0.20 moles and tetraethoxysilane 0.10 moles in approximately 70 grams of xylene were mixed and stirred in a 500 ml 3-neck round bottom flask equipped with a mechanical stirrer, reflux condenser and an addition funnel. Approximately 25-30 grams of water was then slowly added to the solution over a 15 minute period. The addition of water caused a light exotherm. The mixture was further stirred for 4 hours. The mixture was allowed to phase separate and the aqueous layer discarded. The organic layer was vacuum stripped at 70° C. to remove the xylene solvent.

Formulations C, D, and E were evaluated similarly to that above and the results are shown in Table V below:

TABLE V

| Properties tested on 3/8-16 stl N & B degr. & oiled with 5% oil (in - lbs) | D 20% Ma | C 30% Ma | E 40% Ma |
|---|---|---|---|
| 1 hr @ 25 C., degr N & B | 137/172 | 200/114 | 199/292 |
| 1 hr @ 25 C., oiled N & B | 66/67 | 154/144 | 151/212 |
| 24 hr @ 25 C., degr N & B | 413/234 | 374/212 | 226/301 |
| 24 hr @ 25 C., oiled N & B | 236/211 | 309/154 | 190/309 |
| Hot strength @ 300 F., degr N & B | 190/100 | 228/80 | 168/190 |
| Hot strength @ 300 F., oiled | 60/100 | 132/80 | 132/80 |

What is claimed is:

1. An anaerobically curing composition comprising:
   (i) a silicone fluid formed as the reaction product of at least one first silane of formula I:

$$R_nSi(X)_{4-n} \quad (I),$$

wherein the R groups are the same or different and are selected from the group consisting of hydrogen, $C_1$–C alkyl, $C_6$–C aryl, $C_7$–C_arylalkyl, $C_7$–$C_{18}$ alkylaryl, haloalkyl, haloaryl and monovalent ethylenically unsaturated radicals excluding (meth)acryloxy functional groups, X is a hydrolyzable functionality selected from the group consisting of halogen, alkoxy, aryloxy, isocyanato, amino, acetoxy, oximinoxy, aminoxy, amidato, and alkenyloxy, and n is an integer from 0 to 3, and
   at least one second silane of formula II:

$$R^1{}_mR^2{}_pSi(X)_{4-(m+p)} \quad (II),$$

wherein $R^1$ is a (meth)acrylic functional group and $R^2$ can be the same or different and is selected from the group consisting of monovalent ethylenically unsaturated radicals, hydrogen, C1–C alkyl, $C_6$–C aryl, $C_7$–C_arylalkyl, and $C_7$–C_alkylaryl, X is a hydrolyzable functionality selected from the group consisting of halogen, alkoxy, aryloxy, isocyanato, amino, acetoxy, oximinoxy, aminoxy, amidato, and alkenyloxy, m is an integer from 1 to 3, and
   m+p is an integer from 1 to 3,
   (ii) a polymerizable organic (meth)acrylate monomer; and
   (iii) a hydroperoxy anaerobic polymerization initiator capable of inducing polymerization of the composition in the substantial absence of oxygen, and yet not inducing polymerization of the composition in the presence of oxygen.

2. The composition according to claim 1, wherein said at least one second silane is from about 1 to about 99 mole % of the total of said at least one first and said at least one second silane.

3. The composition according to claim 2, wherein said at least one second silane is from about 10 to about 70 mole % of the total of said at least one first and said at least one second silane.

4. The composition according to claim 3, wherein said at least one second silane is from about 20 to about 50 mole % of the total of said at least one first and said at least one second silane.

5. The composition according to claim 1, wherein the silicone fluid is present in an amount that is from about 40 to about 95 weight % of the composition.

6. The composition according to claim 5, wherein the silicone fluid is present in an amount that is from about 50 to about 90 weight % of the composition.

7. The composition according to claim 6, wherein the silicone fluid is present in an amount that is from about 60 to about 85 weight % of the composition.

8. The composition according to claim 1, wherein the polymerizable organic (meth)acrylate monomer is present in an amount that is from about 1 to about 60 weight % of the composition.

9. The composition according to claim 8, wherein the polymerizable organic (meth)acrylate monomer is present in an amount that is from about 5 to about 50 weight % of the composition.

10. The composition according to claim 9, wherein the polymerizable organic (meth)acrylate monomer is present in an amount that is from about 10 to about 40 weight % of the composition.

11. The composition according to claim 1, wherein the polymerization initiator is present in an amount that is from about 0.01 to about 10 weight % of the composition.

12. The composition according to claim 1, wherein R is selected from the group consisting of C1–C alkyl and C6–C aryl.

13. The composition according to claim 12, wherein said at least one first silane is selected from the group consisting of dimethyl dichlorosilane, phenyltrichlorosilane, tetrachlorosilane, trimethylchlorosilane, trimethylmethoxysilane, dimethyldimethoxysilane, phenyltrimethoxysilane, and tetraethoxysilane.

14. The composition according to claim 1, wherein the polymerizable monomer is selected from the group consisting of 2-hydroxyethyl methacrylate, polyethyleneglycol dimethacrylate and dihydrocyclopentadienyloxyethyl methacrylate.

15. The composition according to claim 1, wherein said (meth)acrylic functional group is selected from the group consisting of (meth)acryloxyalkyl, (meth)acryloxyalkenyl, (meth)acryloxyaryl.

16. The composition according to claim 15, wherein the methacrylic functional group is methacryloxypropyl.

17. The composition according to claim 1, wherein R2 is selected from the group consisting of C1–C alkyl, C6–C12 aryl, alkenyl, (meth)acryloxy, and vinyl.

18. The composition according to claim 17, wherein said at least one second silane is selected from the group consisting of (meth)acryloxypropyl trichlorosilane, (meth)acryloxypropyl trimethoxysilane, (meth)acryloxypropyl dimethylchlorosilane, (meth)acryloxymethyl dichlorosilane and (meth)acryloxymethyldimethyl acryloxysilane.

19. The composition according to claim 1, wherein the polymerization initiator is selected from the group consisting of cumene hydroperoxide, p-mentane hydroperoxide, diisopropyl benzene hydroperoxide, pinene hydroperoxide, methyl ethyl ketone hydroperoxide, t-butyl-2-hyroxyethyl peroxide, t-butyl peroxymaleic acid and t-butyl hydroperoxide.

20. A method of producing an anaerobically curing composition comprising the steps of:

allowing at least one first silane of formula I:

$$R_nSi(X)_{4-n} \quad (I),$$

wherein the R groups are the same or different and are selected from the group consisting of hydrogen, $C_1$–C alkyl, $C_6$–C aryl, $C_7$–C_arylalkyl, $C_7$–C_alkylaryl, haloalkyl, haloaryl and monovalent ethylenically unsaturated radicals excluding (meth)acryloxy functional groups, X is a hydrolyzable functionality selected from the group consisting of halogen, alkoxy, aryloxy, isocyanato, amino, acetoxy, oximinoxy, aminoxy, amidato, and alkenyloxy, and n is an integer from 0 to 3, to react in the presence of water to hydrolyze the hydrolyzable functionality with at least one second silane of formula II:

$$R^1_mR^2_pSi(X)_{4-(m+p)} \quad (II),$$

wherein $R^1$ is a (meth)acrylic functional group and $R^2$ can be the same or different and is selected from the group consisting of monovalent ethylenically unsaturated radicals, hydrogen, $C_1$–C alkyl, $C_6$–C aryl, $C_7$–C_arylalkyl, and $C_7$–C_alkylaryl, X is a hydrolyzable functionally selected from the group consisting of halogen, alkoxy, aryloxy, isocyanato, amino, acetoxy, oximinoxy, aminoxy, amidato, and alkenyloxy, m is an integer from 1 to 3, and m+p is an integer from 1 to 3, to produce a silicone fluid;

at ambient temperature and in the presence of oxygen, adding to the silicone fluid a polymerizable organic (meth)acrylate monomer, and a hydroperoxy anaerobic polymerization initiator capable of inducing polymerization of the composition in the substantial absence of oxygen, and yet not inducing polymerization of the composition in the presence of oxygen, thereby producing the anaerobically curable composition.

21. The method according to claim 20, further comprising the step of contacting in the substantial absence of oxygen, the anaerobically curable composition with an activating metal surface that catalyzes the anaerobic curing process in the presence of an anaerobic curing initiator, and allowing said composition to cure to a silicone resin.

22. The method according to claim 20, wherein said at least one second silane is from about 1 to about 99 mole % of the total of said at least one first and said at least one second silane.

23. The method according to claim 22, wherein said at least one second silane is from about 10 to about 70 mole % of the total of said at least one first and said at least one second silane.

24. The method according to claim 23, wherein said at least one second silane is from about 20 to about 50 mole % of the total of said at least one first and said at least one second silane.

25. The method according to claim 20, wherein the silicone fluid is added in an amount that is from about 40 to about 95 weight % of the composition.

26. The method according to claim 25, wherein the silicone fluid is present in an amount that is from about 50 to about 90 weight % of the composition.

27. The method according to claim 20, wherein the polymerizable organic (meth)acrylate monomer is added in an amount that is from about 60 to about 85 weight % of the composition.

28. The method according to claim 27, wherein the polymerizable organic (meth)acrylate monomer is added in an amount that is from about 1 to about 60 weight % of the composition.

29. The method according to claim 20, wherein the polymerization initiator is added in an amount that is from about 5 to about 50 weight % of the composition.

30. The method according to claim 20, wherein R is selected from the group consisting of C1–C alkyl and C6–C12 aryl.

31. The method according to claim 30, wherein said at least one first silane is selected from the of dimethyl dichlorosilane, phenyltrichlorosilane, tetrachlorosilane, trimethylchlorosilane, trimethylmethoxysilane, dimethyldimethoxysilane, phenyltrimethoxysilane, and tetraethoxysilane.

32. The method according to claim 20, wherein the polymerizable monomer is selected from the group consisting of 2-hydroxyethyl methacrylate, polyethyleneglycol dimethacrylate and dihydrocyclopentadienyloxyethyl methacrylate.

33. The method according to claim 20, wherein said (meth)acrylic functional group is selected from the group consisting of (meth)acryloxyalkyl, (meth)acryloxyalkenyl, (meth)acryloxyaryl.

34. The method according to claim 33, wherein the methacrylic functional group is methacryloxypropyl.

35. The method according to claim 20, wherein R2 is selected from the group consisting of C1–C alkyl, C6–C aryl, alkenyl, (meth)acryloxy, and vinyl.

36. The method according to claim 35, wherein said at least one second silane is selected from the group consisting of(meth)acryloxypropyl trichlorosilane, (meth)acryloxypropyl trimethoxysilane, (meth)acryloxypropyl dimethylchlorosilane, (meth)acryloxymethyl dichlorosilane and (meth) acryloxymethyldimethyl acryloxysilane.

37. The method according to claim 20, wherein the polymerization initiator is selected from the group consisting of cumene hydroperoxide, p-mentane hydroperoxide, diisopropyl benzene hydroperoxide, pinene hydroperoxide, methyl ethyl ketone hydroperoxide, t-butyl-2-hyroxyethyl peroxide, t-butyl peroxymaleic acid and t-butyl hydroperoxide.

* * * * *

UNITED STATES PATENT AND TRADEMARK OFFICE
CERTIFICATE OF CORRECTION

PATENT NO. : 5,605,999  
DATED : February 25, 1997  
INVENTOR(S) : Hsien-Kun Chu et al Page 1 of 2

It is certified that error appears in the above-identified patent and that said Letters Patent is hereby corrected as shown below:

| | |
|---|---|
| Column 2, line 62 | change "C7-C-arylalkyl," to --C7-C18 arylalkyl,-- |
| Column 3, line 28 | change "C1-C alkyl" to --C1-C12 alkyl-- |
| Column 3, line 29 | change "C6-C aryl." to --C6-C12 aryl.-- |
| Column 3, line 29 | change "C1-C alkyl or" to --C1-C12 alkyl or-- |
| Column 3, line 30 | change "C6-C aryl," to --C6-C12 aryl,-- |
| Column 3, line 65 | change "C1-C alkyl, C6-C aryl" to --C1-C12 alkyl, C6-C12 aryl-- |
| Column 5, lines 6/7 | change "C1-C alkyl, C6-C aryl, C7-C-arylalkyl, C7-C-alkylaryl, to --C1-C12 alkyl, C6-C12 aryl, C7-C18 arylalkyl, C7-C18 alkylaryl-- |
| Column 6, lines 51/52 | change "C1-C alkyl, C6-C aryl, C7-C-arylalkyl, C7-C-alkylaryl, to --C1-C12 alkyl, C6-C12 aryl, C7-C18 arylalkyl, C7-C18 alkylaryl-- |
| Column 6 lines 63/64 | change "C1-C alkyl, C6-    C7-C-arylalkyl, C7-C-alkylaryl, to --C1-C12 alkyl, C6-C12 aryl, C7-C18 arylalkyl, C7-C18 alkylaryl-- |
| Column 11, lines 40/41 | change "$C_1$-C alkyl,    $C_6$-C aryl, $C_7$-C_arylalkyl, $C_7$-$C_{18}$ alkylaryl, to --C1-C12 alkyl, C6-C12 aryl, C7-C18 arylalkyl, |
| Column 11, lines 56/57 | change "C1-C alkyl, C6-C aryl, C7-C-arylalkyl, and C7-C-alkylaryl, to --C1-C12 alkyl, C6-C12 aryl, C7-C18 arylalkyl, and C7-C18 alkylaryl,-- |
| Column 12, lines 40/41 | change "C1-C alkyl and C6-C aryl" to --C1-C12 alkyl and C6-C12 aryl-- |

UNITED STATES PATENT AND TRADEMARK OFFICE
CERTIFICATE OF CORRECTION

PATENT NO. : 5,605,999
DATED : February 25, 1997
INVENTOR(S) : Hsien-Kun Chu et al It is certified that error appears in the above-identified patent and that said Letters Patent is hereby corrected as shown below:

Column 12, line 60     change "C1-C alkyl" to --C1-C12 alkyl--

Column 13, lines 15/16     change "C1-C alkyl, C6-C aryl, C7-C-arylalkyl, C7-C-alkylaryl, to --C1-C12 alkyl, C6-C12 aryl, C7-C18 arylalkyl, C7-C18 alkylaryl--

Column 13, lines 33/34     change " $C_1$-C alkyl, $C_6$-C aryl, $C_7$-C arylalkyl, and $C_7$-C alkylaryl, to --C1-C12 alkyl, C6-C12 aryl, C7-C18 arylalkyl, and C7-C18 alkylaryl--

Column 14, line 26     change "C1-C alkyl" to --C1-C12 alkyl--

Column 14, lines 44/45     change "C1-C alkyl, C6-C aryl" to --C1-C12 alkyl, C6-C12 aryl--

Signed and Sealed this

Sixth Day of January, 1998

Attest:

BRUCE LEHMAN

Attesting Officer     Commissioner of Patents and Trademarks